(12) United States Patent
Yokota et al.

(10) Patent No.: US 9,935,513 B2
(45) Date of Patent: Apr. 3, 2018

(54) ROTATING ELECTRICAL MACHINE

(71) Applicant: Mitsubishi Electric Corporation, Tokyo (JP)

(72) Inventors: Hirohisa Yokota, Tokyo (JP); Takuma Sasai, Tokyo (JP); Moriyuki Hazeyama, Tokyo (JP); Shinsuke Kayano, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 305 days.

(21) Appl. No.: 14/769,851

(22) PCT Filed: Apr. 22, 2013

(86) PCT No.: PCT/JP2013/061799
§ 371 (c)(1),
(2) Date: Aug. 24, 2015

(87) PCT Pub. No.: WO2014/174579
PCT Pub. Date: Oct. 30, 2014

(65) Prior Publication Data
US 2016/0006307 A1    Jan. 7, 2016

(51) Int. Cl.
*H02K 1/32*    (2006.01)
*H02K 1/27*    (2006.01)

(52) U.S. Cl.
CPC .............. *H02K 1/32* (2013.01); *H02K 1/2766* (2013.01)

(58) Field of Classification Search
CPC ......... H02K 1/32; H02K 1/2766; H02K 1/276
USPC ........................................................ 310/59
See application file for complete search history.

(56) References Cited

U.S. PATENT DOCUMENTS

| 8,274,190 | B2* | 9/2012 | Alexander | B22D 19/0054 |
| | | | | 310/210 |
| 8,487,494 | B2* | 7/2013 | Jurkovic | H02K 1/276 |
| | | | | 310/156.53 |
| 8,664,823 | B2* | 3/2014 | Vyas | H02K 1/2766 |
| | | | | 310/156.53 |
| 9,479,017 | B2* | 10/2016 | Hao | H02K 1/2766 |
| 2005/0140235 | A1 | 6/2005 | Yamagishi et al. | |
| 2007/0096578 | A1 | 5/2007 | Jahns et al. | |

(Continued)

FOREIGN PATENT DOCUMENTS

| JP | 2005-184957 A | 7/2005 |
| JP | 2005-192365 A | 7/2005 |
| JP | 2007-159196 A | 6/2007 |

(Continued)

OTHER PUBLICATIONS

International Search Report for PCT/JP2013/061799 dated Jul. 30, 2013.

*Primary Examiner* — Forrest M Phillips
(74) *Attorney, Agent, or Firm* — Sughrue Mion, PLLC; Richard C. Turner

(57) ABSTRACT

According to an electric motor, a cooling hole is formed outside of a circular arc-like region having an intersection between extension lines from inner side surfaces of adjacent permanent magnets as a center of the circular arc-like region and a distance between the intersection and an intermediate point on the side surface of the permanent magnet as a radius of the circular arc-like region. Thus, heat generation by a magnetic resistance due to the cooling hole is suppressed to improve efficiency.

9 Claims, 5 Drawing Sheets

(56) References Cited

U.S. PATENT DOCUMENTS

2007/0126304 A1   6/2007  Ito et al.

FOREIGN PATENT DOCUMENTS

| JP | 2010-183800 A | 8/2010 |
|---|---|---|
| JP | 4660406 B2 | 3/2011 |
| JP | 2011-223864 A | 11/2011 |

* cited by examiner (a)

(b)

(c)

(d)

(e)

(f)

(g)

ROTATING ELECTRICAL MACHINE

CROSS REFERENCE TO RELATED APPLICATIONS

This application is a National Stage of International Application No. PCT/JP2013/061799 filed Apr. 22, 2013, the contents of all of which are incorporated herein by reference in their entirety.

TECHNICAL FIELD

The present invention relates to a rotating electrical machine including permanent magnets embedded in a rotor core.

BACKGROUND ART

In recent years, high-magnetic energy product permanent magnets have been developed by remarkable research and development on permanent magnets, and downsizing and increase in output of electric motors are being implemented.

In particular, in an electric motor to be used for a vehicle such as a hybrid automobile, a higher torque and a higher output are required to be obtained in a limited space. In order to achieve the higher torque and the higher output, the number of permanent magnets is required to increase a speed.

In this case, rotor core strength, which is required along with increase in centrifugal force, and cooling, which is required along with increase in loss density, become major problems.

Further, eddy currents generated on a surface of each of the permanent magnets increase along with the increased speed to generate heat. As a result, heat demagnetization (irreversible demagnetization) is caused to significantly lower performance such as efficiency of the electric motor, which becomes a serious problem.

Thus, a related-art electric motor includes a rotor core having a cooling hole formed to have a sectional shape that is convex to an outer circumferential side between a pair of permanent magnets opposed to each other in a V-like fashion. Refrigerant is caused to pass through the cooling hole to cool the rotor, thereby preventing the efficiency from being lowered due to temperature rise (see Patent Literature 1, for example).

CITATION LIST

Patent Literature

[PTL 1] JP 4660406 B2

SUMMARY OF INVENTION

Technical Problem

The electric motor described above suppresses the temperature rise while ensuring strength of the rotor core by forming the cooling hole. However, the cooling hole is formed on a magnetic path in the rotor core, which is generated by the permanent magnets. Therefore, the temperature rise generated by a magnetic resistance due to the cooling hole cannot be suppressed. Thus, there is a problem in that the efficiency of the electric motor is disadvantageously lowered.

The present invention has been made to solve the problems described above, and has an object to provide a rotating electrical machine for suppressing heat generation by a magnetic resistance due to a cooling hole to have improved efficiency.

Solution to Problem

According to one embodiment of the present invention, there is provided a rotating electrical machine, including:
an annular stator; and
a rotor arranged on an inner side of the annular stator so as to be rotatable,
the rotor including:
a rotor core having a plurality of cooling holes formed along a circumferential direction, through which refrigerant passes; and
a plurality of permanent magnets arranged at intervals in an outer circumferential portion of the rotor core, in which:
the rotor core has magnet accommodating holes for accommodating the plurality of permanent magnets therein, each being formed on both sides of a line extending from a center of each of the plurality of cooling holes in a radial direction as an axis of symmetry to extend in a radially outer direction to be closed in a V-like fashion so that adjacent ones of the plurality of permanent magnets on a radially outer side of the rotor core are separated away from each other across a first bridge portion therebetween; and
the each of the plurality of cooling holes is formed outside of a circular arc-like region having an intersection between extension lines from inner side surfaces of the adjacent ones of the plurality of permanent magnets as a center of the circular arc-like region and a distance between the intersection and an intermediate point on the inner side surface of each of the plurality of permanent magnets as a radius of the circular arc-like region.

Advantageous Effects of Invention

According to the rotating electrical machine of the one embodiment of the present invention, the cooling hole is formed outside of the circular arc-like region having the intersection between the extension lines from the inner side surfaces of the adjacent permanent magnets as the center and the distance between the intersection and the intermediate point on the side surface of the permanent magnet as the radius. Thus, the heat generation by the magnetic resistance due to the cooling hole is suppressed to improve the efficiency.

DESCRIPTION OF EMBODIMENTS

Figure 1:
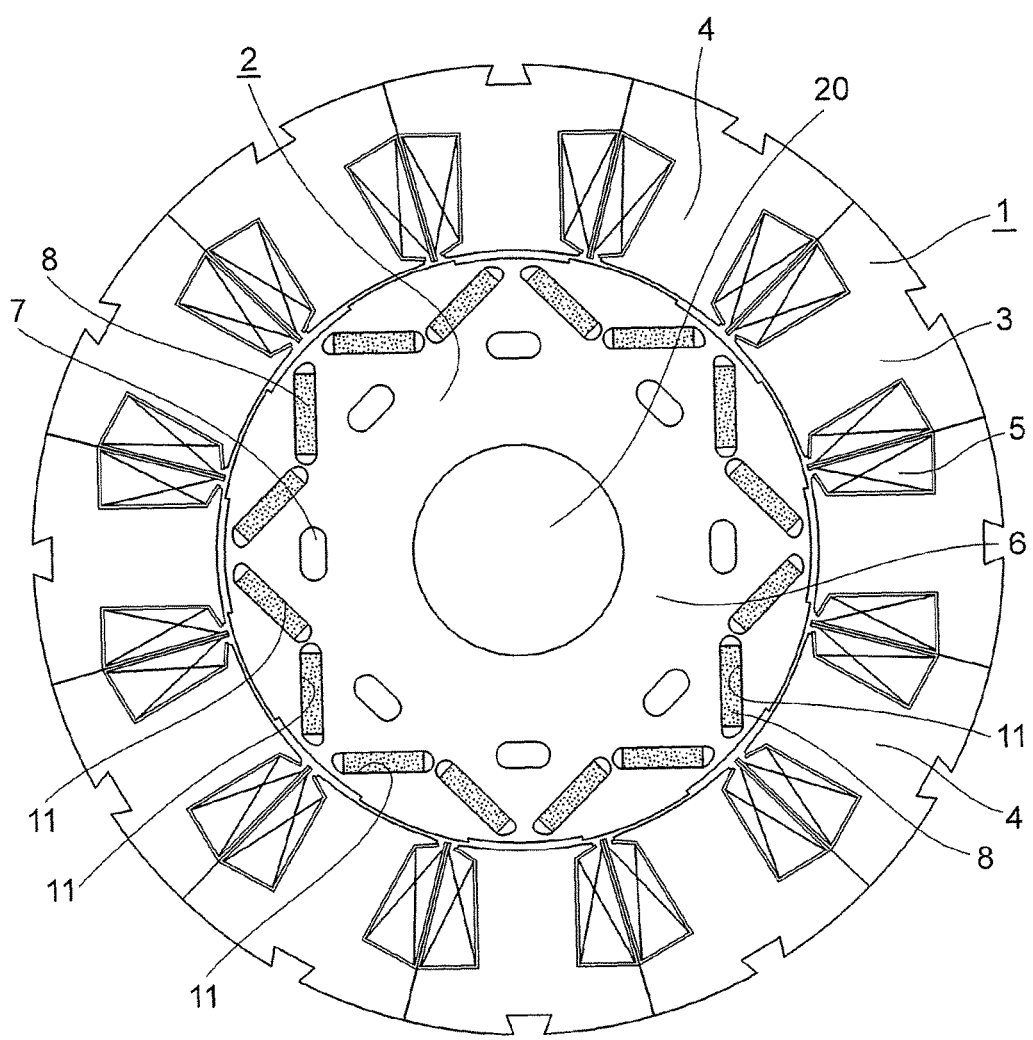
FIG. 1 is a front sectional view for illustrating an electric motor according to a first embodiment of the present invention.

Referring to the drawings, an electric motor according to each of embodiments of the present invention is described

First Embodiment

FIG. 1 is a front sectional view for illustrating an electric motor according to a first embodiment of the present invention.

The electric motor, which is a rotating electrical machine, includes an annular stator 1 and a rotator 2 arranged on a central axis line of the stator 1 so as to be rotatable.

The stator 1 includes a stator core 3 being formed by laminating a plurality of annular electromagnetic steel plates and having teeth 4 defining slots at equal intervals along a circumferential direction, and armature windings 5 each being formed by concentrated winding of a lead wire around each of the teeth 4.

The rotator 2 includes a shaft 20, a rotator core 6 that is fixed to the shaft 20 and has cooling holes 7 formed at equal intervals along the circumferential direction, through which refrigerant passes, and permanent magnets 8 arranged in an outer circumferential portion of the rotator core 6 at equal intervals.

Figure 2:
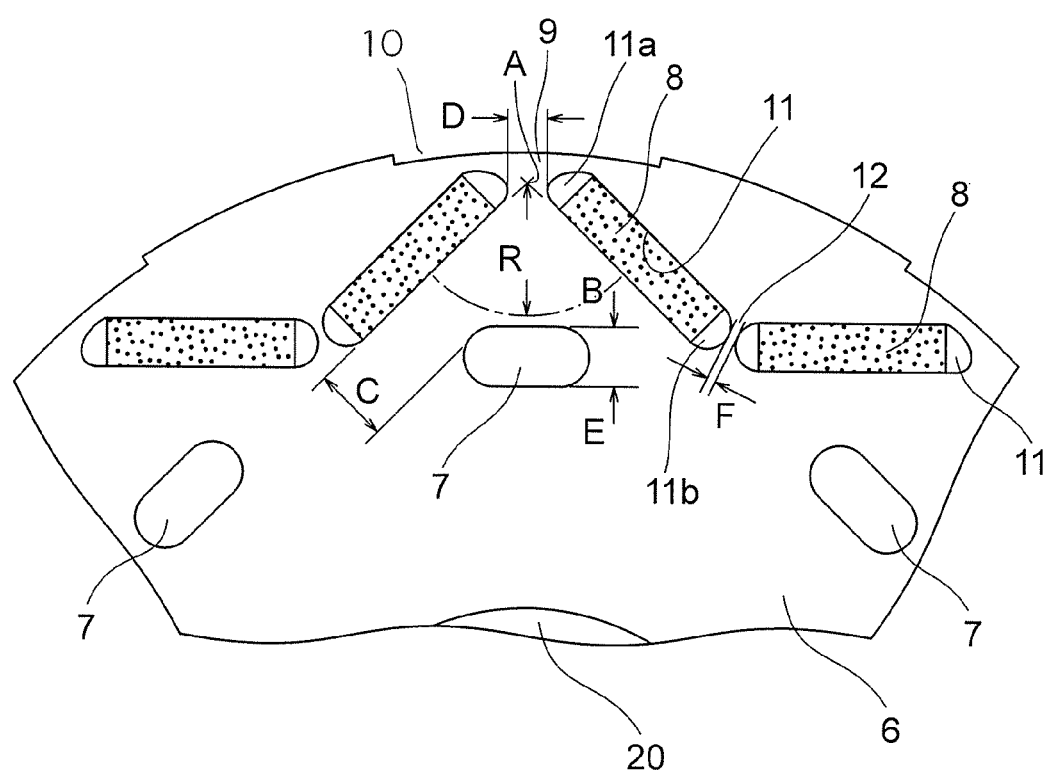
FIG. 2 is an enlarged view of a main part for illustrating the rotor core illustrated in FIG. 1.

FIG. 2 is an enlarged view of a main part for illustrating the rotator core 6 illustrated in FIG. 1.

The rotator core 6 has track-shaped magnet accommodating holes 11 for respectively accommodating the permanent magnets 8 therein, each being formed on both sides of a line extending from a center of each of the cooling holes 7 in a radial direction as an axis of symmetry. The pair of magnet accommodating holes 11 are formed in a V-like fashion that is closed in a radially outer direction. Between the adjacent magnet accommodating holes 11 on a radially outer side, a first bridge portion 9 is formed.

Each of the cooling holes 7 is formed outside of a circular arc-like region having an intersection A between extension lines from inner side surfaces of the adjacent permanent magnets 8 as a center of the circular arc-like region and a distance between the intersection A and an intermediate point B of the permanent magnet 8 as a radius R of the circular arc-like region.

Further, a shortest distance C between the magnet accommodating hole 11 and the cooling hole 7 interposed between the pair of magnet accommodating holes 11 is larger than a shortest distance D between the adjacent permanent magnets 8 in the first bridge portion 9.

Further, a radial width E of the cooling hole 7 is larger than a shortest distance F between the permanent magnets 8 in a second bridge portion 12 formed between the adjacent magnet accommodating holes 11 on a radially inner side.

Further, on an outer circumferential surface of the rotator core 6, a concave portion 10 is formed so as to be opposed to the first bridge portion 9.

Each of the cooling holes 7 is an elongated hole having an oval shape with curved surfaces each expanding outward, which are formed on both sides in the circumferential direction.

Each of the magnet accommodating holes 11 includes a first hollow portion 11a and a second hollow portion 11b formed on both sides of each of the magnet accommodating holes 11, for preventing a leakage flux from the permanent magnet 8.

Figure 3:
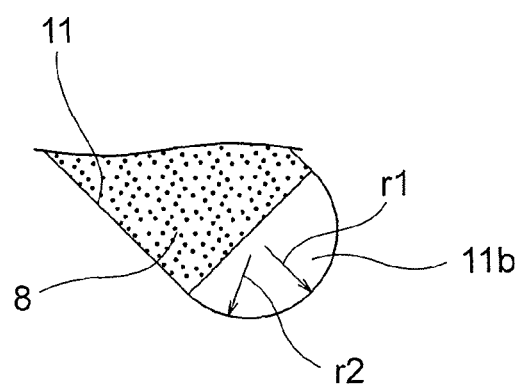
FIG. 3 is an enlarged view of a main part for illustrating the magnet accommodating hole in FIG. 2.

Each of the first hollow portion 11a and the second hollow portion 11b has a curved surface expanding outward. The curved surface has a value of a curvature radius r1 of an intermediate portion and a value of a curvature radius r2 of both sides, which is smaller than the curvature radius r1 as shown in FIG. 3.

A curved surface having the curvature radius r1 and the curvature radius r2 may be formed only for one of the first hollow portion 11a and the second hollow portion 11b.

In the electric motor having the configuration described above, a three-phase AC current is controlled to flow through the armature windings 5 of the stator 1. As a result, a rotating magnetic field is generated in the stator 1. The rotating magnetic field attracts magnetic poles of the rotator 2. As a result, the rotator 2 rotates about the shaft 20.

According to the electric motor of this embodiment, the rotator core 6 has the magnet accommodating holes 11 for accommodating the permanent magnets 8 therein, each being formed on both sides of the line extending from the cooling hole 7 in the radial direction as the axis of symmetry to extend in the radially outer direction to be closed in a V-like fashion.

Further, the cooling hole 7 is formed outside of the circular arc-like region having the intersection A between the extension lines from the inner side surfaces of the adjacent permanent magnets 8 as the center and the distance between the intersection A and the intermediate point B on the side surface of the permanent magnet 8 as the radius.

The adjacent permanent magnets 8 are arranged in a V-like fashion so that a side surface of one of the permanent magnets 8 is an N pole and a side surface of another of the permanent magnets 8, which is opposed to the N pole, is an S pole. The magnetic path from the one permanent magnet 8 to the another permanent magnet 8 is formed.

The circumferential distance between the adjacent permanent magnets 8 increases in a radially inner direction from the first bridge portion 9 between the adjacent permanent magnets 8 to increase a magnetic resistance. On the radially inner side of the intermediate point B of the permanent magnet 8, magnetic force lines scarcely flow.

In this embodiment, the cooling holes 7 are formed in a region in which the magnetic force lines scarcely flow and therefore scarcely become a resistance to the magnetic force lines. Thus, a small-sized highly efficient electric motor can be obtained.

Further, in portions of the outer circumferential surface of the rotator core 6, which are opposed to the first bridge portions 9, the concave portions 10 for suppressing a cogging torque of the rotator 2 are formed.

Therefore, iron loss in field weakening at a harmonic wave increases in the armature windings 5 formed by the concentrated winding. By forming the concave portions 10 on the outer circumference of the rotator core 6 opposed to the first bridge portions 9, Lq (q-axis inductance) can be reduced. Therefore, an rpm of the rotator 2 in the field weakening can be increased to be high.

A radial dimension of each of the first bridge portions 9 is decreased by forming the concave portions 10 to increase a stress in the first bridge portions 9. However, the stress is relaxed by forming the cooling holes 7.

Further, the shortest distance C between the magnet accommodating hole 11 and the cooling hole 7 is larger than the shortest distance D between the adjacent permanent magnets 8 and 8 in the first bridge portion 9. Further, the radial width E of the cooling hole 7 is larger than the shortest distance F between the permanent magnets 8 and 8 in the second bridge portion 12. Therefore, stress concentration on the first bridge portions 9 and the second bridge portions 12 due to a centrifugal force generated by the rotation of the rotator 2 is relaxed.

The relaxation of the stress concentration is verified by strength analysis conducted by the inventors of this application.

Further, a sectional area of a cooling path is increased by enlargement of the width E of each of the cooling holes 7.

As a result, cooling performance is improved, while the rotator 2 is reduced in weight.

Further, each of the cooling holes 7 has the curved surfaces each expanding outward, which are formed on both sides in the circumferential direction. Therefore, the stress concentration on the cooling holes 7 can be relaxed.

Further, the cooling holes 7 are the elongated holes extending in the circumferential direction in the region in which the magnetic force lines are scarcely generated. Therefore, the sectional area of the cooling path is increased without interfering with a magnetic flux passing therethrough. As a result, the cooling performance is improved, while the rotator 2 is reduced in weight.

Further, each of the magnet accommodating holes 11 includes the first hollow portion 11a and the second hollow portion 11b. Therefore, the magnetic flux can be prevented from leaking from both sides of each of the permanent magnets 8 to the rotator core 6.

Further, each of the first hollow portion 11a and the second hollow portion 11b has the curved surface expanding outward. The curvature radius r2 of both sides of the curved surface is smaller than the curvature radius r1 of the intermediate portion. Therefore, the stress concentration on the first bridge portions 9 and the second bridge portions 12 is relaxed.

Second Embodiment

Figure 4:
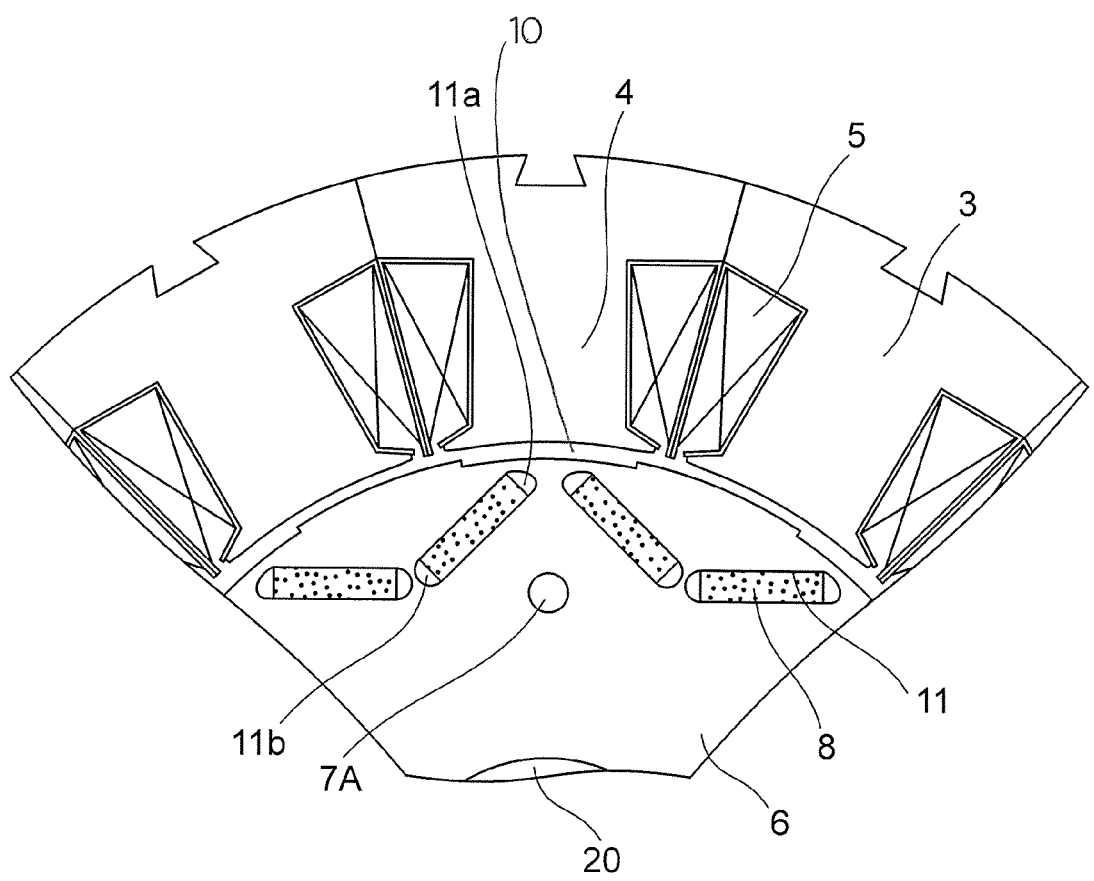
FIG. 4 is a sectional view of a main part for illustrating a rotor of an electric motor according to a second embodiment of the present invention.
Figure 5:
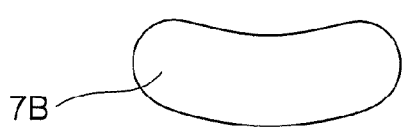
FIG. 5 is a front view for illustrating modifications according to a cooling hole.
Figure 5:
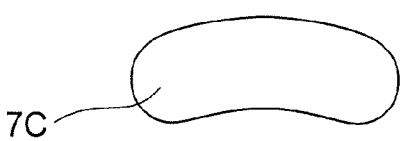
Figure 5:
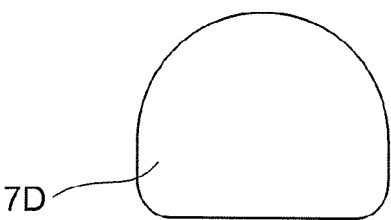
Figure 5:
Figure 5:
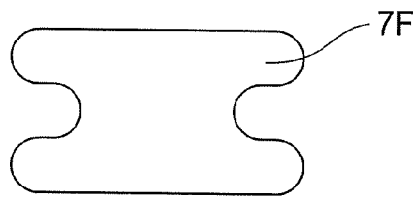
Figure 5:
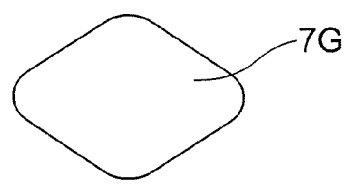
Figure 5:
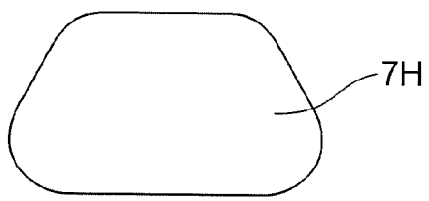

FIG. 4 is a sectional view of a main part for illustrating a rotator 2 of an electric motor according to a second embodiment of the present invention.

In this embodiment, a cooling hole 7A has a circular shape.

The remaining configuration is the same as that of the electric motor according to the first embodiment.

In this embodiment, the same effects as those obtained by the electric motor of the first embodiment can be obtained. In addition, the cooling hole 7A has a circular shape. Therefore, there is an advantage in that the cooling hole 7A can be used for positioning of the rotator 2 in assembly of the electric motor.

Although the electric motor has been described as the rotating electrical machine in each of the embodiments described above, the present invention is also applicable to generators.

The cooling holes 7 or 7A may be replaced by, for example, cooling holes 7B, 7C, 7D, 7E, 7F, 7G, or 7H respectively having shapes illustrated in FIG. 5(a) to FIG. 5(g).

REFERENCE SIGNS LIST 1 stator, 2 rotator, 3 stator core, 4 tooth, 5 armature winding, 6 rotator core, 7 cooling hole, 8 permanent magnet, 9 first bridge portion, 10 concave portion, 11 magnet accommodating hole, 11a first hollow portion, 11b second hollow portion, 12 second bridge portion, 20 shaft, A intersection, B intermediate point, C, D, F shortest distance, E width, R radius, r1, r2 curvature radius.

The invention claimed is:

1. A rotating electrical machine, comprising:
an annular stator; and
a rotator arranged on an inner side of the annular stator so as to be rotatable,
the rotator comprising:
a rotator core having a plurality of cooling holes formed along a circumferential direction, through which refrigerant passes; and
a plurality of permanent magnets arranged at intervals in an outer circumferential portion of the rotator core, wherein:
the rotator core has magnet accommodating holes for accommodating the plurality of permanent magnets therein, each being formed on both sides of a line extending from a center of each of the plurality of cooling holes in a radial direction as an axis of symmetry to extend in a radially outer direction to be closed in a V-like fashion so that adjacent ones of the plurality of permanent magnets on a radially outer side of the rotator core are separated away from each other across a first bridge portion therebetween;
the each of the plurality of cooling holes is formed outside of a circular arc-like region having an intersection between extension lines from inner side surfaces of the adjacent ones of the plurality of permanent magnets as a center of the circular arc-like region and a distance between the intersection and an intermediate point on the inner side surface of each of the plurality of permanent magnets as a radius of the circular arc-like region; and
a shortest distance between each of the magnet accommodating holes and the each of the plurality of cooling holes is larger than a shortest distance between the adjacent ones of the plurality of permanent magnets in the first bridge portion.

2. A rotating electrical machine according to claim 1, wherein the rotator core has a concave portion formed in a portion of an outer circumferential surface of the rotator core, which is opposed to the first bridge portion.

3. A rotating electrical machine according to claim 1, wherein:
a radial width of the each of the plurality of cooling holes is larger than a shortest distance between the plurality of permanent magnets in a second bridge portion between adjacent ones of the magnet accommodating holes of the rotator core on a radially inner side.

4. A rotating electrical machine according to claim 1, wherein the each of the plurality of cooling holes has curved surfaces each expanding outward, which are formed on both sides in the circumferential direction.

5. A rotating electrical machine according to claim 4, wherein the each of the plurality of cooling holes comprises an elongated hole extending in the circumferential direction.

6. A rotating electrical machine according to claim 1, wherein the each of the magnet accommodating holes includes a first hollow portion and a second hollow portion formed on both sides of the each of the magnet accommodating holes, for preventing a leakage flux from the each of the plurality of permanent magnets.

7. A rotating electrical machine according to claim 1, wherein at least one of the first hollow portion or the second hollow portion has a curved surface expanding outward, the curved surface having a curvature radius of both sides smaller than a curvature radius of an intermediate portion.

8. A rotating electrical machine, comprising:
an annular stator; and
a rotator arranged on an inner side of the annular stator so as to be rotatable,
the rotator comprising:
a rotator core having a plurality of cooling holes formed along a circumferential direction, through which refrigerant passes; and
a plurality of permanent magnets arranged at intervals in an outer circumferential portion of the rotator core, wherein:
the rotator core has magnet accommodating holes for accommodating the plurality of permanent magnets therein, each being formed on both sides of a line extending from a center of each of the plurality of cooling holes in a radial direction as an axis of symmetry to extend in a radially outer direction to be closed in a V-like fashion so that adjacent ones of the plurality of permanent magnets on a radially outer side of the rotator core are separated away from each other across a first bridge portion therebetween; and the each of the plurality of cooling holes is formed outside of a circular arc-like region having an intersection within said rotator core between extension lines from inner side surfaces of the adjacent ones of the plurality of permanent magnets as a center of the circular arc-like region and a distance between the intersection and an intermediate point on the inner side surface of each of the plurality of permanent magnets as a radius of the circular arc-like region.

9. A rotating electrical machine, comprising:

an annular stator; and a rotator arranged on an inner side of the annular stator so as to be rotatable, the rotator comprising:

a rotator core having a plurality of cooling holes formed along a circumferential direction, through which refrigerant passes; and a plurality of permanent magnets arranged at intervals in an outer circumferential portion of the rotator core, wherein:

the rotator core has magnet accommodating holes for accommodating the plurality of permanent magnets therein, each being formed on both sides of a line extending from a center of each of the plurality of cooling holes in a radial direction as an axis of symmetry to extend in a radially outer direction to be closed in a V-like fashion so that adjacent ones of the plurality of permanent magnets on a radially outer side of the rotator core are separated away from each other across a first bridge portion therebetween; and the each of the plurality of cooling holes is formed outside of a circular arc-like region having an intersection between extension lines from inner side surfaces of the adjacent ones of the plurality of permanent magnets as a center of the circular arc-like region and a distance between the intersection and an intermediate point on the inner side surface of each of the plurality of permanent magnets as a radius of the circular arc-like region, wherein said radius is smaller than a distance along said axis of symmetry between the each of the plurality of cooling holes and an outer peripheral surface of said rotator core.

* * * * *